United States Patent
Pietrowicz

(10) Patent No.: US 6,275,582 B1
(45) Date of Patent: Aug. 14, 2001

(54) DIFFERENTIAL LINE BRIDGE FOR SCALEABLE NEAR-END SPEECH CANCELLATION FOR TIP AND RING TONE SIGNAL DETECTORS

(75) Inventor: Stanley Pietrowicz, Freehold, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/466,739

(22) Filed: Dec. 17, 1999

(51) Int. Cl.[7] .................................................. H04M 1/00
(52) U.S. Cl. ................... 379/406.05; 379/398; 379/402; 379/404
(58) Field of Search .................................. 379/403, 399, 379/402, 404, 417, 416, 394, 340, 398

(56) References Cited

U.S. PATENT DOCUMENTS

| | | | |
|---|---|---|---|
| 4,829,567 | * | 5/1989 | Moisin .................................. 379/413 |
| 4,910,768 | * | 3/1990 | Sues et al. ............................ 379/394 |
| 4,926,473 | * | 5/1990 | Bahl et al. ............................ 379/416 |
| 5,343,520 | * | 8/1994 | Willocx et al. ....................... 379/399 |
| 5,649,009 | * | 7/1997 | Enriquez et al. ..................... 379/399 |
| 5,680,447 | * | 10/1997 | Diamond et al. ..................... 379/215 |
| 5,796,810 | | 8/1998 | Lim et al. ............................. 379/142 |
| 5,818,927 | * | 10/1998 | Nishimura ............................ 379/403 |
| 5,943,407 | * | 8/1999 | Davis et al. .......................... 379/142 |
| 5,974,138 | * | 10/1999 | Sambhwani et al. ................. 379/373 |
| 6,044,068 | * | 3/2000 | El Malki .............................. 370/286 |
| 6,122,353 | * | 9/2000 | Brady et al. ......................... 379/142 |

* cited by examiner

Primary Examiner—Fan Tsang
Assistant Examiner—Ovidio Escalante
(74) Attorney, Agent, or Firm—Orville Cockings

(57) ABSTRACT

Apparatus for interconnecting the Tip and Ring telephone line interface to subsequent communications equipment or circuits through a differential line bridge circuit that extracts one or more unidirectional paths containing predominantly far-end energy, wherein, near-end speech signals have been canceled. The differential line bridge circuit maintains the longitudinal balance of the telephone line and exhibits improved noise immunity in the recovered far-end signal. It permits all telephone supervisory, alerting and bidirectional communication signals to pass transparently between the telephone line interface and the subsequent communications equipment or circuits. Access to on-hook service signals, such as calling party identification and short text messaging data transmissions, is inherently provided by the line bridge. By employing one or more selectable networks in the line bridge, the bridge is able to adapt to the characteristics of the telephone line and provide scalable near-end speech cancellation is disclosed.

24 Claims, 3 Drawing Sheets

DIFFERENTIAL LINE BRIDGE FOR SCALEABLE NEAR-END SPEECH CANCELLATION FOR TIP AND RING TONE SIGNAL DETECTORS

RELATED APPLICATIONS

The subject matter of this application is related to U.S. patent application Ser. No. 09/304,402, filed May 3, 1999, and entitled A Method and System for Scalable Near-End Speech Cancellation for Tip and Ring Tone Detectors, which is assigned to assignee of the present application.

FIELD OF THE INVENTION

The present invention relates to methods and systems that provide suppression of near-end speech energy for applications including, but not limited to, improving the talkoff and talkdown performance of inband signal tone detection systems. In particular, the present invention relates to telephone line bridging methods that extract a unidirectional path containing predominantly far-end energy and transparently pass telephone line supervisory, alerting and communications signals to subsequent communications equipment without terminating the telephone line.

BACKGROUND OF THE INVENTION

For a more comprehensive discussion of the prior art, reference should be made to U.S. patent application Ser. No. 09/304,402 entitled, A Method and System for Scalable Near-End Speech Cancellation for Tip and Ring Tone Detectors which is assigned to the assignee of the present application. The Background of the Invention section of U.S. patent application Ser. No. 09/304,402 is herein incorporated by reference for the purpose of illustrating the state of the prior art and for supplementing the prior art discussion included herein.

The deployment of new CLASS services, such as Calling Identity Delivery on Call Waiting (CIDCW) and Call Waiting Deluxe (CWD), has created renewed interest in telephone near-end speech cancellation methods and systems. Once primarily used to enable bi-directional communications on a single twisted pair, speech cancellation systems are now needed to improve the reliability of inband tone signal detection for vertical telephone services. Vertical services, such as CIDCW and CWD, require special Customer Premises Equipment (CPE) that can reliably detect a unique inband tone signal, known as the CPE Alerting Signal (CAS). The CAS is transmitted by central office switching equipment to initiate transfer of the service-related information. Reliable tone detection is critical for CIDCW and CWD CPE because the CAS is the trigger for the CPE to enter data mode and receive the service information. CIDCW, for example, enables a subscriber who is engaged in a telephone conversation to receive the caller ID information associated with a second call on call waiting. The successful reception and display of the waiting caller's information to the subscriber requires the detection and acknowledgement of the CAS by subscriber equipment. Inband tone signal detection is complicated when resistance to speech simulations and detection of alerting signals masked by the subscriber speech are both desired, as is the case for CIDCW, CWD, and any off hook GR-30-CORE, Issue 2, December 1998, entitled "Voiceband Data Transmission Interface", Issue 1, December 1994, services. Based on the prior art, it is known that the performance and reliability of CAS detection methods can be significantly improved by attenuating or canceling near-end speech signals in the receive channel, wherein the CAS is present, prior to signal discrimination by the CAS detector.

Of particularly high interest are a special class of near-end speech cancellation methods and systems that can transparently be inserted in series with the Tip and Ring telephone interface prior to the communications equipment or a typical communications circuit. These systems are herein referred to as Tip and Ring speech cancellation systems or circuits; these special systems differ in two ways from most traditional two-to-four wire hybrid circuits. First, Tip and Ring speech cancellation systems extract a receive signal channel without terminating the telephone line. One of their key functions is to transparently pass the telephone line supervisory, alerting and communications signals to subsequent or subtending communications equipment or circuitry. Traditional telephone hybrid circuits, on the other hand, were designed for end devices that terminate the telephone line. Second, Tip and Ring speech cancellation systems are designed to highly attenuate near-end speech signals to produce a pure receive channel commonly used to feed tone detection and data demodulation circuits. Traditional hybrid circuits, on the other hand, were designed to support bidirectional communications and engineered to only modestly attenuate near-end speech because a controlled sidetone response was desired.

One popular application for Tip and Ring speech cancellation systems is in telephone adjunct devices, such as Type 2 CIDCW adjuncts. A telephone adjunct connects between the telephone line and the customer's existing equipment, such as a standard telephone set. The value of adjunct devices is that they allow the customer to incrementally add support for enhanced services without necessitating the disposal of their existing equipment. In addition, adjuncts allow CPE manufacturers to introduce new service capabilities without incurring the expense of replacing the functionality already present in the customer's existing equipment. Because adjuncts connect in series with the telephone line, adjunct devices need to faithfully pass telephone supervisory signals (i.e., DC signals), alerting signals (ringing) and communications signals (i.e., AC signals) between the telephone line and the subsequent or subtending communications equipment. Consequently, Tip and Ring speech cancellation systems are well suited for adjuncts that employ near-end speech cancellation to improve tone signal detection.

A second popular application for Tip and Ring speech cancellation systems is in convenient front-end solutions that add enhanced service support to existing communications circuits. Faced with demand for shortened development cycles in a highly competitive environment, CPE manufacturers strongly desire to reuse as much of their existing technology as possible in new products. Because they connect directly to the telephone line and transparently pass telephone supervisory, alerting and communications signals, Tip and Ring speech cancellation systems enable CPE manufacturers to introduce enhanced services circuitry in front of their existing communications circuit designs without adversely affecting their performance or creating need for their modification.

A prior art Tip and Ring speech cancellation system 100 is illustrated in FIG. 1. This arrangement employs the fundamental Wheatstone bridge principle as described in Lim et. al., U.S. Pat. No. 5,796,810, Aug. 18, 1998, entitled "Apparatus for Dialing of Caller ID Block Code and Receiving Call Waiting Caller-ID-Signal" (hereinafter Lim). FIG. 1 shows a basic Wheatstone bridging circuit consisting of elements Ra 112, Rb 113, and R3 114. The multiple network option 130 that is shown in FIG. 1 is described in my U.S. patent application Ser. No. 09/304,402, and is discussed below. The objective of the Wheatstone bridging circuitry in FIG. 1 is to match the impedance of R3 to that of Z 115, the unknown impedance of a subscriber loop. In William L. Everitt's "Communications Engineering" (McGraw-Hill 1937) (hereinafter Everitt) a Wheatstone bridge is defined to be a physical circuit comprised of two parallel legs wherein each leg contains the series combination of two impedances. For the purposes of discussion, assume that Ra 112 and Z 115, in FIG. 1, comprise the left leg of the Wheatstone bridge and Rb 113 and R3 114 comprise the right leg of the bridge. Specifically, Everitt defines a Wheatstone bridge as: (1) a rhombus-like physical circuit; wherein (2) tapping of two output signals, one from the center of each leg of the bridge, points D and E in FIG. 1, is performed; and (3) circuit balance (i.e., no voltage difference) is achieved when the ratio of the impedances of the left leg of the bridge is equal to the ratio of the impedances of the right leg of the bridge; given that (4) the same potential or input signal is applied across both legs of the bridge. The characteristic balance condition occurs when the voltage drops across Z 115 and R3 114 are approximately equal both in magnitude and phase.

In accordance with FIG. 1, if the balance network 114 identically matches the impedance of the loop in both magnitude and angle and fixed resistors Ra 112 and Rb 113 are identical, then any near-end speech signals generated by the subsequent communications equipment or circuit appearing at the center points of the bridge will be identical in both magnitude and phase. Under these conditions, the bridge is said to be balanced. Speech cancellation occurs when the signals tapped from the center points of the bridge are processed by a differential amplifier 116. The differential amplifier 116 subtracts the tapped signals from each other and produces a resultant signal wherein near-end speech is canceled. In practice, resistance Rb 113 is scaled by a factor C greater than resistance Ra 112 to reduce the loading effects of the bridge on the Tip and Ring interface. Likewise, the balance network impedance is scaled by the same factor C to maintain a balanced bridge.

As shown in FIG. 1, in accordance with a classic Wheatstone bridge arrangement, the Lim patent comprises a rhombus-like arrangement of resistors wherein Ra 112 and Rb 113 form the lower half of the bridge and resistor R3 114 and Z 115, the loop or line impedance, form the upper half of the bridge. As previously stated, a more convenient construct of Lim's Wheatstone bridge for the purposes of this discussion is to visualize Rb 113 and R3 114 as forming the right leg of the bridge and Ra 112 and Z 115 as forming the left leg of the bridge. In accordance with the normal operation of the Wheatstone bridge, the signal source 118, as described by Lim, is connected across the left and right legs of the bridge. In accordance with another characteristic of the Wheatstone bridge, Lim describes the tapping of signals from the center of the bridge, points D and E, and a balance condition when Z/Ra=R3/Rb and the same potential is coupled across the left and right legs of the bridge. In Lim the loop impedance Z 115 is assumed to be 600 ohms, Ra is 10 ohms, R3 is 60,000 (60 k) ohms, and Rb is 1 k ohms. Using these values, the bridge in Lim's patent operates like a classic Wheatstone bridge. In this instance, Z/Ra=R3/Rb= 60, the signals used for cancellation are tapped from the center of the bridge, and the same potential or voltage is coupled across the left and right legs of the bridge.

The basic line bridge circuit in FIG. 1 performs rather poorly in practice primarily because loop impedances Z 115 vary over a wide range and deviate from 600Ω in both magnitude and phase. The near-end speech cancellation performance of the basic line bridge circuit in FIG. 1 rapidly degrades as the impedance of the balance network diverges from the loop impedance. Since loop impedances vary in the telecommunications network, multiple balance networks and a network selection method need to be employed as described in U.S. patent application Ser. No. 09/304,402 to achieve high attenuation of near-end speech energy in the resultant receive signal when interconnecting to the PSTN.

Referring to the multiple network option 130 in FIG. 1, far-end signals or those signals incident upon the bridge from the telephone line are reduced in amplitude by the voltage divider formed by elements Ra 112 and Rb 113 and balance network Bn 120 as described in my U.S. patent application Ser. No. 09/304,402; note that Bn 120 in practice would consist of a plurality of similarly positioned balanced networks, however, for simplicity a plurality is not shown. To maintain transparency of the Tip and Ring interface, element Ra 112 is usually chosen to have a small resistance of 10 ohms. Loop current flow proceeds from the Tip lead through the subsequent communications equipment 118 and returns to the Ring lead through element Ra 112. Since the impedances of elements Ra 112 and Rb 113 are a couple orders of magnitude less than the loop impedance and balance network impedance, far-end signals are significantly attenuated and require amplification by the differential amplifier.

One disadvantage of the prior art line bridge circuit in FIG. 1 even when a perfect balance network is employed is that there is an effective loss in the signal-to-noise ratio for far-end signals. The differential amplifier is typically referenced to a system ground located at about point A since the system diode bridge is usually placed across the secondary Tip and Ring interface leads serving the subsequent communications equipment or circuit. Its input signals are derived from resistors Ra 112 and Rb 113 which are substantially smaller in magnitude than the other elements in the voltage divider circuit. As a result, the far-end signals appearing at the input to the differential amplifier 116 are highly attenuated and brought closer to the system noise floor. The differential amplifier subtracts the attenuated far-end signal appearing at the center point of the balance leg from the attenuated far-end signal appearing at the center point of the primary leg containing the element Ra 112. Because these signals are 180 degrees out of phase, the differential amplifier adds these two highly attenuated signals in the presence of system noise. In this environment, the effective signal-to-noise ratio could be quite low. Increased noise in the resultant signal occurs because both noise and recovered far-end signal are amplified by the differential amplifier. This is undesirable since far-end signals need to be cleanly recovered for input to sensitive tone signal detectors and data demodulators 150.

A second disadvantage of the line bridge circuit in FIG. 1 is that it introduces an imbalance in the telephone line with the insertion of element Ra 112 in one lead of the telephone interface. A fundamental principle of the modern telephone network is the concept of a balanced line to reduce the influence of inductive noise. That is, each lead of the Tip and Ring interface ideally has the same impedance to ground. When noise penetrates the twisted pair in a proper design, its influence on each conductor will be similar. If the pair is balanced, the end terminal equipment, such as a telephone, can extract the metallic communications signal (Tip-to-Ring voltages) and reject the common mode noise signals (Tip-to-ground and Ring-to-ground). However, if the impedance of each lead of the telephone interface is different, longitudinal noise currents will be converted to the metallic noise voltages that are superimposed on the metallic communications signals. By inserting element Ra 112 into one lead of the telephone line interface, the prior art line bridge in FIG. 1 creates a line imbalance and the potential for noise current conversion. Since the conversion of longitudinal noise to a metallic signal depends upon the characteristics of the subsequent communications equipment or circuit, the prior art line bridge is only conditionally transparent. In adjunct applications, control over the characteristics of subsequent equipment is not possible. In such applications, a lack of transparency in the prior art line bridge may cause the subsequent communications equipment to malfunction.

Of utility then would be circuitry which overcomes these limitations in the prior art. Specifically, circuitry that does not degrade the signal-to-noise ratio of the far-end signal and that does not introduce an imbalance in the telephone line would be advantageous.

SUMMARY OF THE INVENTION

It is an object of the present invention to provide a differential line bridge circuit for interconnecting the Tip and Ring telephone line interface to subsequent communications equipment or circuits.

In particular, the present invention includes a differential line bridge that advantageously: (1) Extracts one or more unidirectional paths containing predominantly far-end energy, wherein, near-end speech signals have been canceled; (2) Transparently passes telephone line supervisory, alerting and communications signals to subsequent communications equipment or circuits without terminating the telephone line; (3) Maintains the longitudinal balance of the telephone line; (4) Provides improved noise immunity in the recovered far-end signal; (5) Provides access to on-hook service signals, such as calling party identification and short text messaging data transmissions; (6) Adapts to the characteristics of the telephone line; and (7) Permits the degree of near-end speech cancellation to be scalable.

In accordance with my invention the differential line bridge interconnects the primary tip and ring leads of a subscriber loop to subsequent communications equipment or circuitry that is coupled to a secondary tip and ring lead thereby passing telephone line supervisory alerting and communication signals. The differential line bridge in one embodiment comprises two low impedance sensing elements that are each positioned or connected in series with each of the tip and ring leads. By using a low impedance element in each of the tip and ring leads I am able to maintain longitudinal balance and take advantage of the impedance to provide surge and power cross protection in accordance with FCC regulations and industry safety standards. In addition, the series combination of two high impedance elements is connected from each lead of the primary tip and ring to each lead of the secondary tip and ring such that each series combination forms a circuit loop with the subscriber loop, office equipment, and sensing element, the combination of two such circuit loops form a chain-link double bridge. Signals are tapped from a midpoint between each of these high impedance elements and are fed to a differential amplifier. The differential amplifier then takes the difference of the two tapped signals to produce a signal wherein near end speech energy is highly attenuated.

Another advantage of my invention is that the telephone line is not terminated by the differential line bridge. The sensing elements, although having low impedances, because they are in series with each tip and ring lead can only assist in terminating the line if the loop is closed by the subsequent communications equipment or circuitry. Furthermore, by using high impedance elements in the differential line bridge, the circuitry does not provide any significant termination.

Also, my invention provides better noise immunity because the signals fed to the differential amplifier are not highly attenuated and not near the system noise floor and each tapped signal sees an approximately equal impedance at the telephone line interface to help reduce common mode noise.

In another embodiment of my invention, improvement is made to the circuitry by providing the functionality of the high impedance elements through a plurality of impedance elements that are switch-coupled to the tip and ring thereby allowing for the matching of the impedance of any given subscriber loop.

The advantages and objects of my invention can be better understood by reference to the drawings and detailed description below.

DETAILED DESCRIPTION OF THE INVENTION

Figure 1:
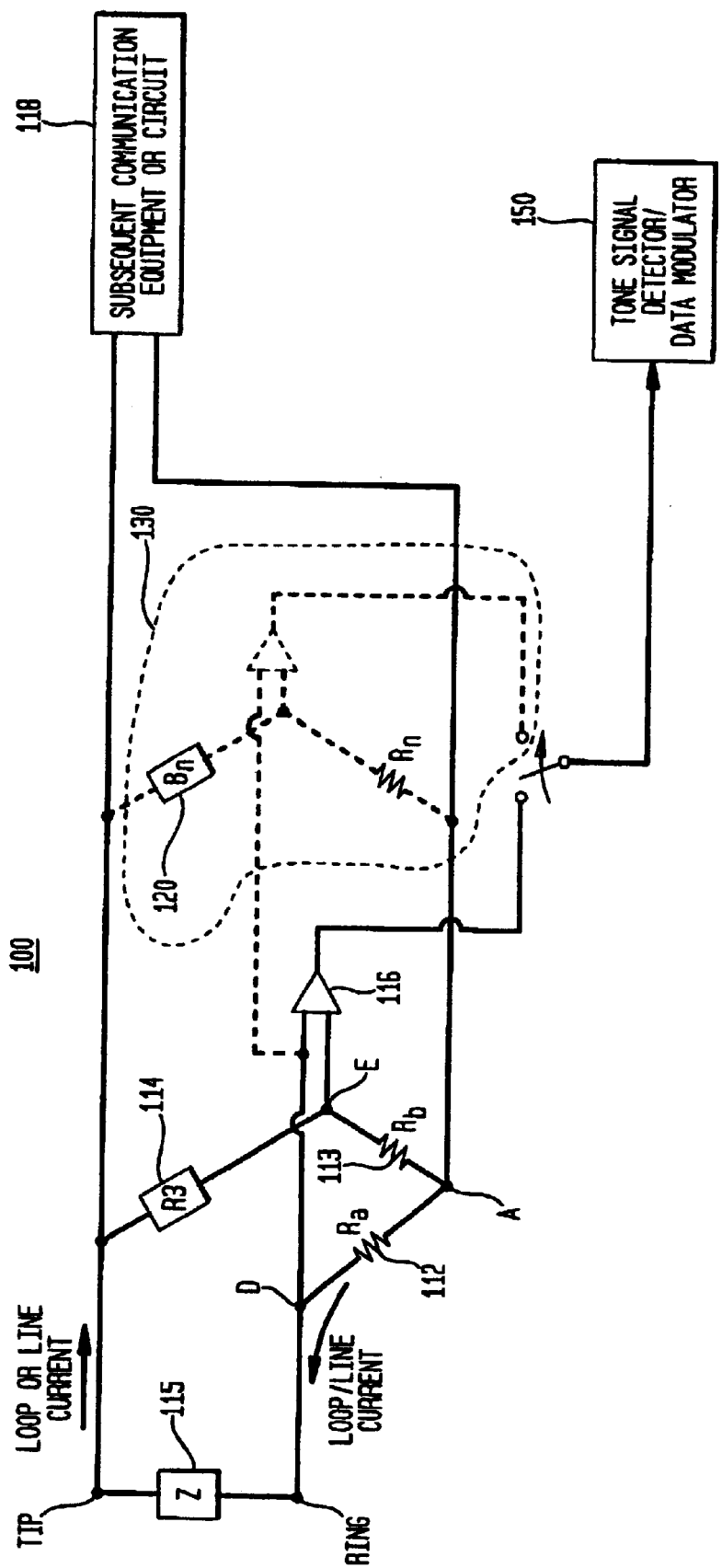
FIG. 1 is illustrative of prior art line bridges.
Figure 2:
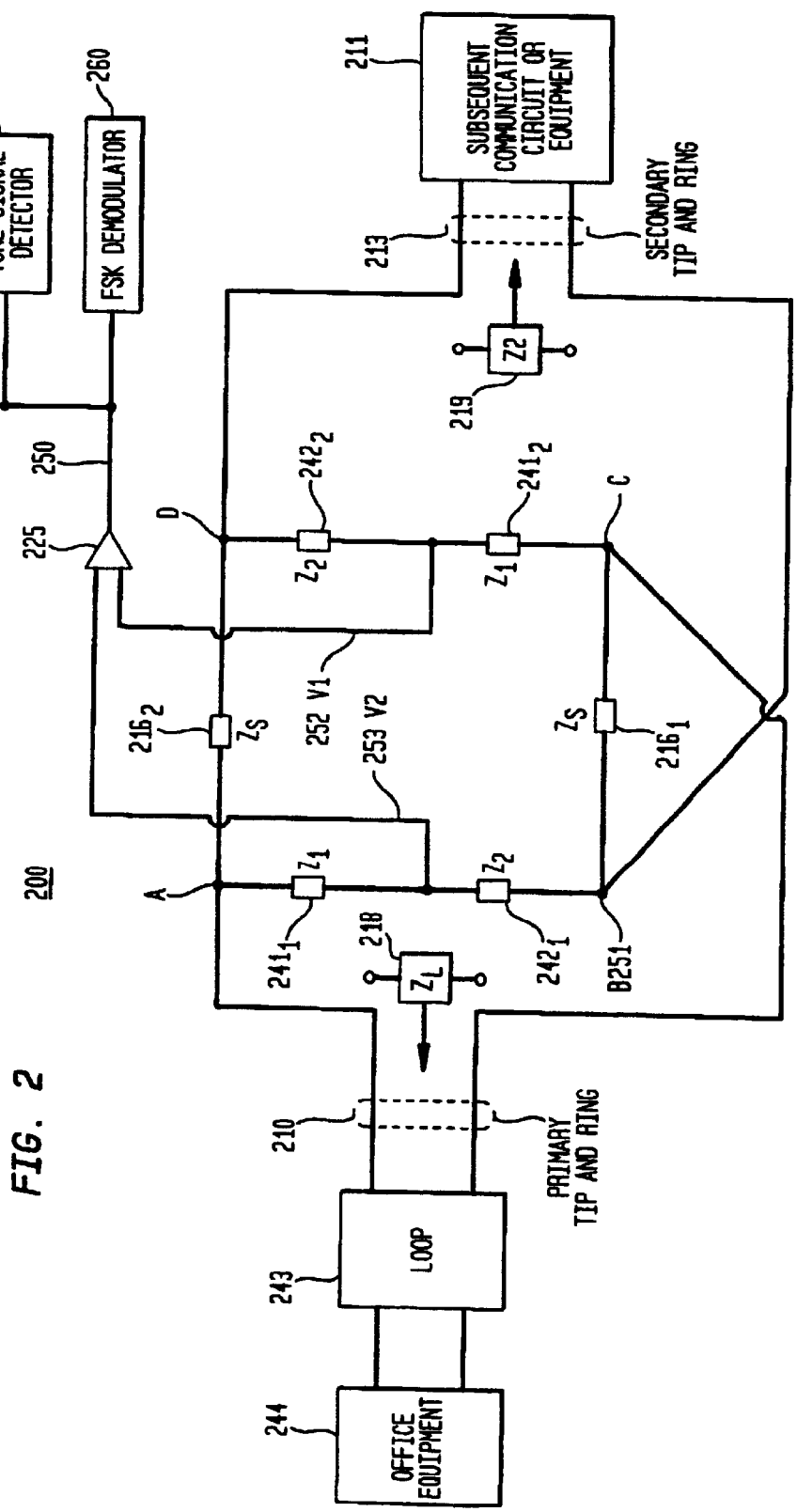
FIG. 2 is an embodiment of a differential line bridge in accordance with the present invention.
Figure 3:
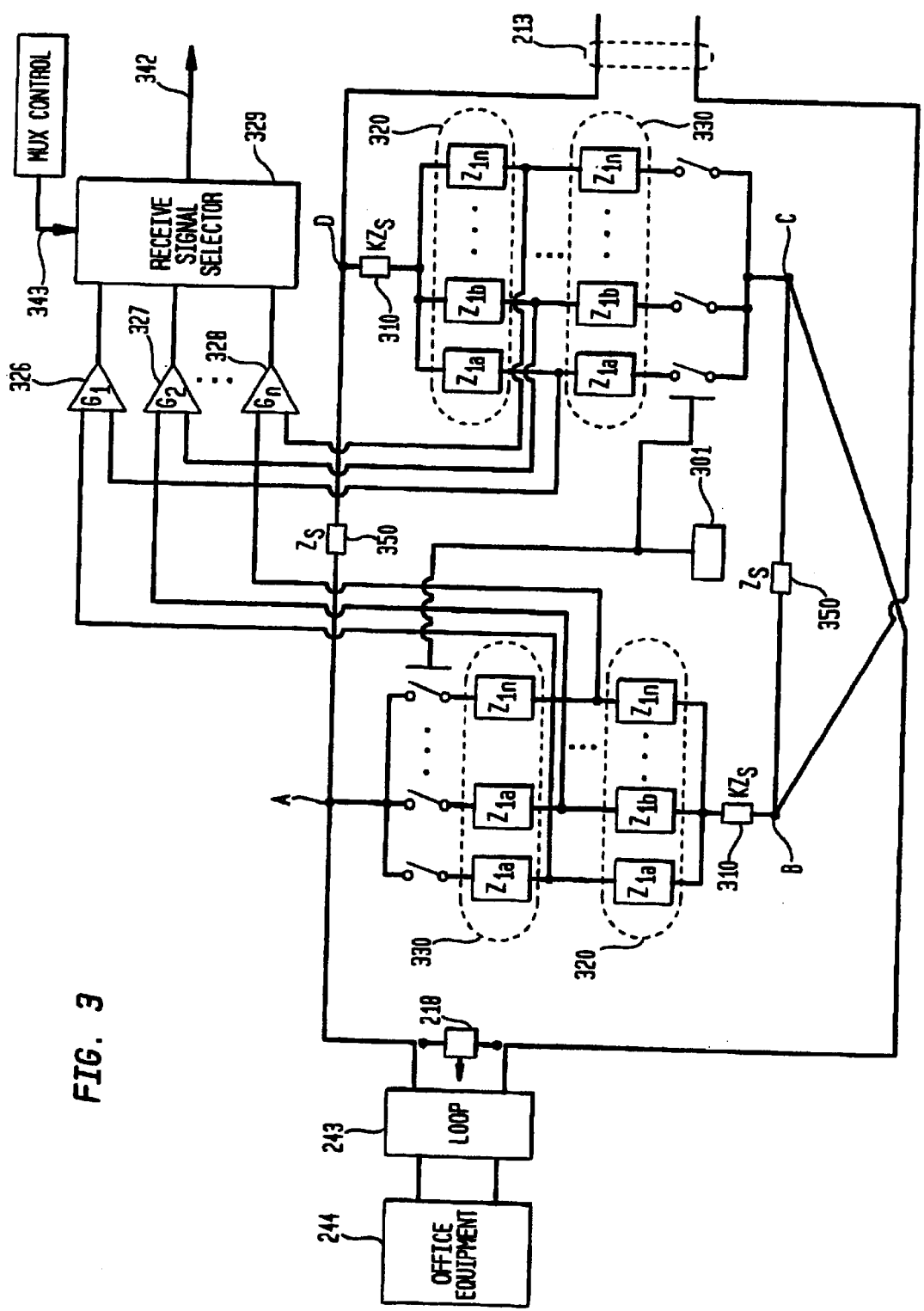
FIG. 3 is another embodiment a differential line bridge having multiple networks in accordance with the present invention.

Turning now to FIG. 2, there is illustrated an embodiment of a basic differential line bridge 200 in accordance with the present invention. The differential line bridge interconnects the Tip and Ring telephone line interface to subsequent or subtending communications equipment or circuits and extracts one or more unidirectional paths containing predominantly far-end energy, wherein, near-end speech signals have been canceled. For the purposes of explaining the operation of the differential line bridge, FIG. 2 illustratively depicts a basic, single network version of the differential line bridge in accordance with the present invention. A multiple network configuration using the differential line bridge is depicted in FIG. 3 and will be discussed later.

Turning again to FIG. 2, there is shown a differential line bridge interconnecting a telephone line interface, shown as primary Tip and Ring 210 interface, to subsequent communications equipment or circuits 211 through the secondary Tip and Ring interface 213. The primary and secondary Tip and Ring interfaces are connected through a pair of sensing elements Zs 216. One sensing element Zs 216 is positioned in series with each of the Tip and Ring leads, thereby maintaining telephone line balance and overcoming a limitation of prior art line bridges. A series pair of impedance elements Z1 241 and Z2 242 is positioned from each lead of the primary tip and ring to each lead of the secondary tip and ring such that each series combination forms a circuit loop with the subscriber loop, office equipment, and sensing element, the combination of two such circuit loops form a chain-link double bridge. Specifically, impedance elements $241_1$ and $242_1$ are connected in parallel with the combined impedance of the loop or line ZL 218 and sensing element $216_1$, while impedance elements $241_2$ and $242_2$ are connected in parallel with the combined impedance Z2 219 of the subtending equipment or circuit 211 and the opposite sensing element $216_2$. The voltage inputs, V1 252 and V2 253, to the differential amplifier 225 are each tapped from a point between the impedance elements Z1 241 and Z2 242, with V1 252 being positioned between impedance elements $241_2$ and $242_2$ and V2 253 being positioned between elements $242_1$ and $242_2$.

As discussed below, impedance elements 241 and 242 are advantageously coupled to the telephone line through a capacitive element (not explicitly shown, but should be understood to be part of these elements so as to prevent DC closure). Accordingly, impedance elements 241 and 242 may advantageously include resistors, capacitors, and inductors. Those of ordinary skill in the art will also recognize that impedance elements 241 and 242 may be also be implemented by active devices, such as transistors.

The process whereby the differential line bridge cancels near-end speech energy is not immediately forthcoming by visual inspection of the circuit in FIG. 2. To explain the operation of the differential line bridge, a brief mathematical derivation is helpful to understand the conditions under which cancellation occurs. For the purposes of this analysis, assume that the speech signals produced by the subsequent communications equipment or circuits 211 can be represented by a time-varying, AC signal, A(t), and that the combined impedance of the loop 243 and office equipment 244 is represented by the single impedance ZL 218. Using location B 251 as the signal reference, it can be shown that the signal voltage V1(t) 252 due to near-end speech signal A(t) is given by Eq. 1.

$$V1 = \frac{A(t)Zs}{2Zs+ZL} + A(t)\left(1 - \frac{Zs}{2Zs+ZL}\right)\left(\frac{Z1}{Z1+Z2}\right) \qquad \text{Eq. 1}$$

The first term in Eq. 1 represents the voltage due to time-varying signal A(t) across the series element Zs $216_1$. The second term in Eq. 1 represents the portion of the time-varying signal A(t) across the element Z1 $241_2$. Likewise, it can be shown that the signal voltage V2(t) 253 due to near-end speech signal A(t) is given by Eq. 2.

$$V2(t) = \frac{A(t)(ZL+Zs)}{2Zs+ZL}\left(\frac{Z2}{Z1+Z2}\right) \qquad \text{Eq. 2}$$

The first half of Eq. 2 represents the voltage due to time-varying signal A(t) across the combination of loop 243 impedance, office equipment 244 impedance and sense element Zs $216_1$. The second half of Eq. 2 represents the portion of this voltage across the element Z2 $242_1$.

Signals V1(t) 252 and V2(t) 253 are input to the differential amplifier 225, whereupon the difference signal V1(t)–V2(t) is created. Subtracting Eq. 2 from Eq. 1 and manipulating the result, it can be shown that the difference signal is given by Eq. 3.

$$V1(t) - V2(t) = \frac{A(t)}{2Zs+ZL}\left(Zs + (Zs+ZL)\left(\frac{Z1-Z2}{Z2+Z1}\right)\right) \qquad \text{Eq. 3}$$

For near-end speech cancellation to occur with the differential line bridge, the difference voltage V1(t)–V2(t) should ideally go to zero. In practice, V1 and V2 are usually not identically matched due to component tolerances. Therefore, near end speech is attenuated, but usually not perfectly cancelled. Depending on the choice and number of networks, the degree of attenuation may be scaled to attenuate near end speech by a desired amount. In addition, in practice the tolerances and variances associated with the design of electronic circuitry may not permit the difference of V1 and V2 to be exactly equal to zero. Using Eq. 3, the following condition must be satisfied for near-end speech cancellation:

$$\frac{Zs}{Zs+ZL} = \frac{Z2-Z1}{Z2+Z1} \qquad \text{Eq. 4}$$

Separating the numerator and denominator of Eq. 4 into independent equations results in Eqs. 5 and 6.

$$Zs = Z2 - Z1 \qquad \text{Eq. 5}$$

$$Zs + ZL = Z2 + Z1 \qquad \text{Eq. 6}$$

Solving Eqs. 5 and 6 simultaneously for impedance values Z1 and Z2 results in the following conditions for differential line bridge balance:

$$Z1 = \frac{ZL}{2} \qquad \text{Eq. 7}$$

$$Z2 = Zs + \frac{ZL}{2} = Zs + Z1 \qquad \text{Eq. 8a}$$

$$\frac{Zs}{Zs+ZL} = \frac{Z2-Z1}{Z2+Z1} = \frac{KZ2-KZ1}{KZ2+KZ1} = \frac{K(Z2+Z1)}{K(Z2+Z1)} \qquad \text{Eq. 8b}$$

Eqs. 7 and 8a indicate that the differential line bridge will completely cancel near-end speech energy in the resultant receive signal 250 when element Z1 241 is equal to half the combined impedance of the loop 243 and office equipment 244 and element Z2 242 is approximately equal to the combined impedance of the sense element Zs 216 and the secondary leg element Z1 241. To avoid loading the Tip and Ring interface and to comply with telephone standards, elements Z1 241 and Z2 242 are scaled by a value K; typically K can be set to any value between 1 and 10,000. Typically Z1 and Z2 need to be set to high impedance values to satisfy FCC regulations for on-hook impedance of terminal equipment. However, my differential line bridge does not require Z1 and Z2 to be high impedance elements. Thus, although current practice requires Z1 and Z2 to be high impedance elements, if current practices change the differential line bridge may be suitably adapted.

As shown in Eq. 8b, scaling elements Z1 and Z2 does not impact the operation of the differential line bridge of the present invention. By replacing Z1 and Z2 with KZ1 and KZ2, respectively, in Eq. 4, the balance condition for the differential line bridge is still satisfied. Reworking Eq. 5 and Eq. 6, it can be shown that perfect near-end speech energy cancellation occurs when:

$$R1 = K\left(\frac{RL}{2}\right) \qquad \text{Eq. 9}$$

$$Z2 = K\left(Zs + \frac{ZL}{2}\right) = KZs + Z1 \qquad \text{Eq. 10}$$

For design purposes, the impedance value ZL in Eqs. 7 through 10 represents the combined loop 243 and office equipment 244 impedance. The embodiment shown in FIG. 2 represents a significant improvement over the prior art in that the telephone interface remains balanced and that the signals at the input to the differential amplifier 225 are no longer near the noise floor.

Those skilled in the art may recognize that the elements comprising my differential line bridge may be rearranged to appear as two rhombus like structures each similar to a Wheatstone bridge, but that are chain-linked around the common loop and office impedance elements 243 and 244. Specifically, and with reference to FIG. 2, the path A-B-C may be viewed as forming the lower bridge of the chain having elements $241_1$, $242_1$, and $216_1$. The rhombus-like physical configuration of the upper chain link is formed along the path A-D-C by elements $216_2$, $242_2$, and $241_2$. Those skilled in the art will also note that this chained link structure creates a circuit that is uniquely different from the classic Wheatstone bridge. A few important distinctions between my differential line bridge and the Wheatstone bridge should be noted. First, the matching impedance condition necessary for speech cancellation in my differential line bridge is different from the balance condition for a classic Wheatstone bridge. If either the upper or lower bridge functioned as a classic Wheatstone bridge the ratio of the effective loop impedance ZL to Zs would need to be approximately equal to the ratio of Z1 to Z2 for balance. However, using Eq. 7 and Eq. 8a, it can be shown that the balance condition for my differential line bridge is satisfied only when the ratio of ZL to Zs is approximately equal to 2Z1/(Z2−Z1). Second, in a Wheatstone bridge, signals are tapped from the center of each leg comprising the bridge. It is these signals that match in magnitude and phase when the balance condition exists. With my differential line bridge only one signal is tapped from each of the upper and lower bridges in the chain link structure. If two signals were tapped from the center of each leg of either the upper or lower bridge, the signals would not be balanced, i.e., approximately equal in magnitude or phase. Third, the input signal or voltage potential from the subsequent communications equipment 211 is not directly applied across both branches or legs of either the upper or lower bridge. Rather, it is divided with the opposing bridge's sensing element.

Having shown that the differential line bridge provides near-end speech energy cancellation, it is another object of the present invention to transparently pass telephone line supervisory, alerting and communications signals to the subsequent communications equipment or circuits without terminating the telephone line. Transparency of the differential line bridge is achieved by two inherent design considerations. First, sensing elements Zs 216 of the differential line bridge are selected to be low impedance elements, preferably less than 30 ohms. Sensing elements Zs 216 may, nonetheless, have impedance values ranging between a few (e.g., two or three) ohms and two hundred (200) ohms. The limiting factor on the impedance value of Zs is the combined impedance value of the subsequent communications equipment and differential line bridge as seen from the network. The network expects to see less than 400 ohms at the customer network interface. Accordingly, if the impedance of the subsequent communications equipment is known (e.g., both the subsequent communications equipment and line bridge are designed by the same supplier) then the impedance of Zs may be set between a few ohms and 200 ohms so that the network still sees less than 400 ohms at the network or customer interface. Accounting for the presence of two sensing elements Zs 216 in series with the loop, the effective impact of the differential line bridge on telephone line supervisory, alerting and communications signals is similar to having extended the customer loop 243 by approximately 375 feet of 22 gauge wire when the sensing element impedance value is 6 ohms. In the overwhelming large majority of situations, this modest loop extension should have absolutely no impact as long as line balance is maintained.

Second, the insertion of a sensing element Zs 216 in each lead of the Tip and Ring interface maintains telephone line balance and thereby allows the subsequent communications equipment or circuits 211 to reject longitudinal noise.

Furthermore, my differential line bridge does not terminate the telephone line. Sensing elements Zs 216 are in series with each lead of the Tip and Ring interface and can only assist in terminating the line if loop closure is provided by the subsequent communications equipment or circuits 211. Furthermore, elements Z1 241 and Z2 242 are capacitively coupled to the telephone line and cannot provide DC closure. By design, elements Z2 242 and Z1 241 are also high impedance elements and therefore do not provide any significant termination to the telephone line interface.

As previously mentioned, telephone line balance is maintained because identical sense impedance elements are inserted in each lead of the Tip and Ring interfaces. Besides maintaining line balance and forming an integral part of the differential bridge, these small impedance elements can also serve another useful purpose. All telephone equipment must be designed to safely handle lightning surge currents and power line cross conditions to be compliant with FCC Part 68 Rules and Regulations and safety standards such as UL1459 and UL 1950. Small resistances on the same order of magnitude as sensing elements Zs 216 are commonly positioned in series with the Tip and Ring leads to assist in reducing metallic and longitudinal surge currents created by environmental conditions. Sensing elements Zs 216 can replace these current limiting resistances as a lateral benefit of the differential line bridge.

Another benefit of the differential line bridge is that it exhibits improved noise immunity in the resultant receive signal 250. One reason for this improved noise immunity is that each tapped signal, V1 252 and V2 253, has an approximately equal impedance to the telephone line interface. Better common mode noise rejection at the differential amplifier 225 can therefore be achieved. A second reason for improved noise immunity is that far-end signals appearing at V1 252 and V2 253 are not highly attenuated and pushed into the noise floor as in prior art line bridges. Assuming that far-end signals can be represented by the time-varying, AC signal B(t), it can be shown that far-end signals appearing on the tapped signals V1 252 and V2 253 are given by Eqs. 11 and 12.

$$V1(t) = B(t)\left(\frac{Z1}{Zs+Z1+Z2}\right) = B(t)\left(\frac{K\left(\frac{ZL}{2}\right)}{(K+1)Zs+KZL}\right) \quad \text{Eq. 11}$$

$$V2(t) = B(t)\left(\frac{Z2+Zs}{Zs+Z1+Z2}\right) = B(t)\left(\frac{(K+1)Zs+K\left(\frac{ZL}{2}\right)}{(K+1)Zs+KZL}\right) \quad \text{Eq. 12}$$

Neglecting sense element Zs 216 terms since these impedance values are small, Eqs. 11 and 12 indicate that far-end signals appearing on V1 252 and V2 253 are only attenuated by about a factor of two. To recover the far-end signal, the relatively strong signals V1 252 and V2 253 are subtracted from each by the differential amplifier 225 to produce the difference signal in Eq. 13. To recover the far-end signal B(t), the differential amplifier 225 applies gain to the difference signal according to Eq. 14. Although the differential line bridge still requires the same amount of gain as the prior art line bridge, noise immunity in the resultant receive signal 250 is improved since the differential amplifier 225 is subtracting two fairly strong signals rather than summing two highly attenuated signals with lower signal-to-noise ratios.

$$V1(t) - V2(t) = B(t)\left(\frac{Zs - Z1 + Z2}{Zs + Z1 + Z2}\right) \quad \text{Eq. 13}$$

$$= B(t)\left(\frac{(K+1)Zs}{(K+1)Zs + KZL}\right)$$

$$\text{Gain} = \frac{Zs + Z1 + Z2}{Zs - Z1 + Z2} = \frac{(K+1)Zs + KZL}{(K+1)Zs} \quad \text{Eq. 14}$$

The following example will serve to summarize the differential line bridge design equations (Eq. 9, Eq. 10 and Eq. 14). Assume that the differential line bridge is attempting to match an impedance of 900 ohms. Further assume that the sense element Zs 216 is a resistive 10 ohms and the factor K is 100. According to Eq. 9, the impedance of element Z1 41 is 45,000 ohms. According to Eq. 10, the impedance of element Z2 42 is 46,000 ohms. The gain of the differential amplifier is 90.1 according to Eq. 14.

Another object of the present invention is to provide access to on-hook telephone service signals, such as calling party identification and short text messaging data transmissions. As illustrated in FIG. 2, the differential line bridge is connected to the primary Tip and Ring interface 210 and has access to the telephone line and any on-hook signals regardless of the hook state of the subsequent communications equipment or circuits 211. The resultant receive signal 250 extracts the on-hook service data signal and makes it available to a tone signal detector 255, data demodulator 260, energy estimator 265 or other on-hook service signal processing circuit, as appropriate.

Finally, it is an object of the present invention to adapt to the characteristics of the telephone line and provide a means for scalable near-end speech cancellation. As previously discussed, the wide range of loop impedances present in the telecommunications network renders use of a single balance network inadequate if the objective is to highly attenuate near-end speech energy in the resultant receive signal 250. Speech cancellation performance rapidly falls off when the balance network impedance and combined loop 243 and office equipment 244 impedance are moderately mismatched. When the impedances are significantly different, the roll-off in speech cancellation performance flattens, but the absolute cancellation performance is moderately low. Given the speech cancellation response and the wide range of loop impedances that may be encountered, the preferred differential line bridge uses multiple balance networks to adapt to the customer installation. The use of additional balance networks enables improvements to be effected in the worst case near-end speech cancellation performance. The differential line bridge has scalable near-end speech cancellation performance since increasingly better cancellation can be achieved with the use of additional balance networks.

FIG. 3 illustrates a differential line bridge configuration using multiple balance networks. The differential line bridge is extended to support multiple loop networks by employing multiple impedance elements that can be switchable coupled to the loop thereby better matching the impedance of any given loop in the network. By incorporating a similar calibration procedure as disclosed in U.S. patent application Ser. No. 09/304,402, the balance network within the group of available networks that provides the best near-end speech energy cancellation for the customer installation can be selected by a switch control 301. The switch control 301 operates the balance network switches S1 through Sn on each bridge in double-throw fashion.

To more accurately represent an actual discrete component circuit implementation, the element Z2 242 in FIG. 2 has been split into two impedance elements in FIG. 3. As defined in Eq. 10, the impedance of element Z2 242 is the sum of KZs 310 and Z1 241; thus, Z2 242 from FIG. 2 is replaced by the sum of elements KZs 310 and the plurality of Z1a through Z1n elements 320. Z1 241 is a function of the desired matching impedance and is likely to be different for each leg in the multiple network configuration. However, the impedance element KZs 310 remains constant across all networks and can therefore be a common element when using a switched balance network implementation as shown in FIG. 3. The element Z1 241 is shown as the set of elements Z1a through Z1n 330, where a through n represent a separate instance of the secondary leg in the multiple network configuration. If few balance networks are required, control switch 301 can also be eliminated and each network could be hardwired. However, care must be taken when hard wiring multiple networks to avoid presenting an unnecessary load on the Tip and Ring interface. In a non-switched, multiple balance network implementation, each path having Z1 241 and Z2 242 must remain completely separate and sharing of common impedance elements is not possible.

Separate differential amplifiers, G1 326, G2 327 through Gn 328, are illustrated in FIG. 3 instead of a single programmable amplifier. The use of separate differential amplifiers may be more practical; however, a single, gain programmable amplifier implementation is also possible with my differential line bridge. In the latter case, a control signal like that disclosed in my U.S. patent application Ser. No. 09/304,402 is required to set the amplifier gain according to Eq. 14 based on the balance network selection. In the case of separate differential amplifiers, a receive signal selector 329 is needed that connects the output of the appropriate differential amplifier to the resultant receive signal 342 according to a multiplexer control signal 343.

For optimal near-end speech cancellation performance, impedance elements Zs 350 and KZs 310 should differ from each other by a factor K. This relationship is subject to component tolerances and consequently fixed impedance elements are never identically matched to the target K factor. This results in an imbalance in the bridge that reduces speech cancellation performance. To compensate for this practical consideration, impedance elements KZs 310 could be replaced with a combination of impedance ladder and fixed impedance elements as disclosed in my U.S. patent application Ser. No. 09/304,402. Similarly, a calibration procedure like that disclosed in U.S. patent application Ser. No. 09/304,402 can be applied to the differential line bridge to optimize the ratio of impedance elements Zs 350 and KZs 310.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated. Specifically, although the above description illustratively uses electronic components it can be designed using integrated circuitry technology wherein the resistors, capacitors, and inductors are replaced by other electrical elements common used by those of ordinary skill in the art. In addition, those of ordinary skill in the art will also recognize that the conditions necessary for ideal operation, i.e., the level of attenuation, will be dependent on the tolerances of the components chosen to implement my invention.

What is claimed is:

1. Circuitry for near end speech cancellation, said circuitry being coupled to primary tip and ring leads that are connected to a telephone line interface and secondary tip and ring leads that are connected to subsequent communications equipment, said circuitry comprising:

a pair of sensing elements, one of said sensing elements being positioned in series with the tip leads and the other of said sensing elements being positioned in series with the ring leads;

a first and a second pair of series connected first and second impedance elements, the first impedance element of the first pair being series connected to one of the primary tip and ring leads and to one side of a first sensing element, the second impedance element of the first pair being connected to the other of the secondary tip and ring leads and to one side of a second sensing element, the second impedance element of the second pair being connected to the other side of the first sensing element, and the first impedance element of the second pair being connected to the other side of the second sensing element;

first and second outputs, said first voltage output being tapped from a point between the first and second impedance elements of the first pair and said second voltage output being tapped from a point between the first and second impedance elements of the second pair; and wherein each of said first impedance element impedance is approximately equal to half the scaled value of the impedance of the telephone line and each of said second impedance element impedance is approximately equal to the combined impedance of said scaled value of said sensing element and said first impedance element, whereby the difference between said first and second voltage outputs results in attenuated near end speech.

2. The circuitry in accordance with claim 1 wherein said first and second impedance elements each comprises an impedance element capacitively coupled to said tip and ring leads.

3. The circuitry in accordance with claim 2 further comprising a differential amplifier having a pair of inputs and an output, each said inputs being coupled to said first and second voltage outputs.

4. The circuitry in accordance with claim 3 wherein said amplifier output is coupled to a tone signal detector.

5. The circuitry in accordance with claim 4 wherein said sensing elements are less than 200 ohms.

6. The circuitry in accordance with claim 5 wherein said first and second impedance elements are high impedance elements.

7. The circuitry in accordance with claim 3 wherein said amplifier output is coupled to a data modulator.

8. The circuitry in accordance with claim 3 wherein said amplifier output is coupled to an energy estimator.

9. Circuitry for near end speech cancellation, said circuitry being coupled to primary tip and ring leads that are connected to a telephone line interface and secondary tip and ring leads that are connected to subsequent communications equipment, said circuitry comprising:

a pair of sensing elements, one of said sensing elements being positioned in series with the tip leads and the other of said sensing elements being positioned in series with the ring leads;

a first and a second pair of series connected first and second impedance elements, the first impedance element of the first pair being series connected to one of the primary tip and ring leads and to one side of a first sensing element, the second impedance element of the first pair being connected to the other of the secondary tip and ring leads and to one side of a second sensing element, the second impedance element of the second pair being connected to the other side of the first sensing element, and the first impedance element of the second pair being connected to the other side of the second sensing element;

first and second voltage outputs, said first voltage output being tapped from a point between the first and second impedance elements of the first pair and said second voltage output being tapped from a point between the first and second impedance elements of the second pair;

a switch controller;

wherein said impedance elements of said sensing elements are chosen such that the difference between said first and second voltage outputs results in attenuated near end speech, said first impedance elements each comprising a first plurality of impedance elements wherein the impedance of each of said first plurality is parallelly coupled into the circuitry by said switch controller such that said first plurality of elements are combined to form the impedance of said first impedance element;

a third impedance element that is approximately equal to a multiple of said sensing element; and said second impedance elements each including a second plurality of impedance elements wherein the impedance of each of said second plurality is parallely and selectively coupled into the circuitry by said switch controller such that the sum of the impedance of said third impedance element and the impedance of said second plurality is approximately equal to the impedance of said second impedance element.

10. The circuitry in accordance with claim 9 further comprising a plurality of amplifiers each of said plurality of amplifiers having a pair of inputs and an output, said inputs being connected to points between each of said first and second plurality of impedance elements.

11. The circuitry in accordance with claim 10 further comprising a receive signal selector coupled to each of said amplifier outputs and a multiplexer controller and wherein each of said amplifier outputs is combined in said signal selector under the control of said multiplexer controller to form a resultant signal wherein near end speech is highly attenuated.

12. The circuitry in accordance with claim 11 wherein said resultant signal is coupled to a tone signal detector.

13. Circuitry for near end speech cancellation, said circuitry being coupled to a primary tip and ring lead that is interconnecting a telephone line and a secondary tip and ring lead that is interconnecting subsequent communications equipment, said circuitry comprising:

a differential line bridge coupled to the tip and ring leads, said differential line bridge comprising:

a pair of sensing elements, one of said sensing elements being positioned in series with the tip leads and the other of said sensing elements being positioned in series with the ring leads;

a first and a second pair of series connected first and second impedance elements, the first impedance element of the first pair being connected to one of the primary and tip and ring leads and to one side of a first sensing element, the second impedance element of the first pair being connected to the other of the second trip and ring leads and to one side of a second sensing element, the second impedance element of the second pair being connected to the other side of the first sensing element, and the first impedance element of the second pair being connected to the other side of the second sensing element;

a differential amplifier having a pair of inputs and coupled to said line bridge such that near end speech energy from the subsequent communications equipment is cancelled;

first and second voltage outputs, said first voltage output being tapped from a point between the first and second impedance elements of the first pair and said second voltage output being tapped from a point between the first and second impedance elements of the second pair and wherein said impedance elements and said sensing elements are chosen such that the difference between said first and second voltage outputs results in attenuated near end speech energy, and wherein each said first impedance element impedance is approximately equal to half the scaled value of the impedance of the telephone line impedance and each said second impedance element impedance is approximately equal to the combined impedance of said scaled value of said sensing element and said first impedance element.

14. The circuitry in accordance with claim 13 wherein said sensing elements are less than 200 ohms.

15. The circuitry in accordance with claim 14 wherein said first and second impedance elements are high impedance elements.

16. Circuitry for near end speech energy cancellation, said circuitry being coupled to a primary tip and ring lead that is interconnecting a telephone line interface and a secondary tip and ring lead that is interconnecting subsequent communications equipment, said circuitry comprising:

a differential line bridge coupled to the tip and ring leads, said differential line bridge comprising a pair of sensing elements, each of said pair of sensing elements being positioned in series with each of the tip and ring leads and wherein each of said pair of sensing elements and the telephone line impedance are connected to form a primary leg of each of an upper and lower bridge; and first and second voltage outputs, wherein said first voltage output is tapped at a point between one of said pair of first and second impedance elements and said second voltage output is tapped at a point between the other of said pair of first and second impedance elements and wherein said first impedance element impedance is approximately equal to a scaled value of the impedance of the telephone line impedance and said second impedance element is approximately equal to the combined impedance of said scaled value of said sensing element and said first impedance element, whereby said impedance elements and said sensing elements are chosen such that the difference between said first and second voltage outputs results in highly attenuated near end speech energy; and a differential amplifier having a pair of inputs and coupled to said line bridge.

17. The circuitry in accordance with claim 16 wherein said differential amplifier inputs are coupled to said secondary legs center taps.

18. Circuitry for near end speech cancellation for a tone signal detector, said circuitry comprising:

a pair of sensing elements, a first of said sensing elements being connected in series between the tip lines connected to a telephone line interface and to a subsequent communications equipment interface and a second of said sensing elements being connected in series between the ring lines of the telephone line interface and the subsequent communications equipment interface, a first pair of first impedance elements connected in a first path between the tip line of the telephone line interface and the ring line of the subsequent communications equipment interface, a second pair of second impedance elements connected in a second path between the ring line of the telephone line interface and the tip line of the subsequent communications equipment interface, each of said first impedance elements comprising a first plurality of individual impedance elements connected in parallel and each of said second impedance elements comprising a second plurality of individual impedance elements connected in parallel and a third impedance element that has an impedance approximately equal to a multiple of the impedance of the sensing elements, said third impedance element being connected in series with said parallel second plurality of second impedance elements, and switch means for selectively connecting one of said first and one of said second plurality of individual impedance elements in said first and said second paths.

19. The circuitry in accordance with claim 18 wherein said differential amplifier means comprises a plurality of individual differential ampliers each having a first and a second input connected to the coupling between individual ones of said first and second pluralities of impedance elements in said first and second paths.

20. The circuitry in accordance with claim 19 wherein said sensing elements are less than 200 ohms.

21. The circuitry in accordance with claim 20 wherein said first and second impedance elements are high impedance elements.

22. The circuitry in accordance with claim 21 wherein said signal detection means comprises a tone signal detector.

23. The circuitry in accordance with claim 21 wherein said signal detection means comprises a data demodulator.

24. The circuitry in accordance with claim 21 wherein said signal detection means comprises an energy estimator.

* * * * *